Patented May 11, 1926.

1,584,583

UNITED STATES PATENT OFFICE.

FRANK MONTGOMERY WOOD, OF LOS ANGELES, CALIFORNIA.

PROCESS FOR PREPARING VACCINES.

No Drawing.    Application filed February 29, 1924. Serial No. 696,088.

My invention relates to detoxicated proteins and bacterial vaccines made from pathogenic micro-organisms and toxic proteins, generally, and, especially, for use in the treatment of human diseases caused by such pathogenic micro-organisms and toxic proteins; as well as to the preparation of such products, including the detoxication of toxic proteins and pathogenic micro-organisms.

It is well known that a great many diseases are caused by the presence of toxic proteins in the system, and these are frequently the products of the life processes of pathogenic micro-organisms present therein; and my invention has for its main object the detoxication of such organisms and substances whereby they may be used in the treatment of such diseases.

1. The exact treatment to which I subject the different materials varies, due to variation in the character and thickness of the capsule and to the variation in the character and content of the toxins produced by different bacteria; but generally stated, I treat the cultures of micro-organisms, or solid media, or of magma, after having been centrifuged out of the liquid media with a solution of sodium hydroxide made by mixing 10-25% of a 35% solution of sodium hydroxide in sterile distilled water, with 90-75% of additional sterile distilled water, and this treatment is continued for such a length of time (and this varies considerably with the different proteins and micro-organisms from as low as three minutes to as high as forty-eight hours) as may be necessary to break the bacterial envelope, and this time may be ascertained by making a microscopic examination at half hour intervals; in the case of pollens this step is replaced by treatment with a solution of 6% of glacial acetic acid in sterile distilled water, and in case of micro-organisms having a fatty or waxy capsule I replace this step by treatment with a 40% formaldehyde solution and subsequent extraction with acetone; the temperatures at which such treatments take place varying from −4° to 100° C., as may be necessary to break the capsule or outer envelope of the micro-organisms or substances treated.

2. The suspension is then removed to a sterile glass container and treated with pure powdered trypsin 25%, dissolved in sterile distilled water previously made alkaline with 1% sodium bicarbonate, and the ferment is allowed to act at 37.5° C. for about five to eight minutes, the time varying according to the amount of toxins present in the material treated which are to be rendered inert. In case the micro-organisms under treatment are capsulated and are known to produce split proteins during their growth, in the media, I add sufficient sterile distilled water after the trypsin has acted for 2.5 minutes to assist in carrying the ferment through the capsule by osmosis and digest the toxic proteins both within and without the capsule. The tone of this solution is then made normal and this requires sufficient distilled water to balance the bacterial protein, the sodium hydroxide, and the trypsin present, whereupon the action of the ferment is continued for 2.5 minutes to completely digest the toxic proteins in and beneath the capsule in capsulated micro-organisms.

3. I then treat the resulting solution with a 15% solution of sodium oleate in warm sterile distilled water, agitating with a pipette for about 3 minutes to perfect the soapy solution.

4. I then add 0.5% of 95% phenol and agitate with a pipette to complete solution of the phenol, and then permit it to stand for about 5 minutes.

5. I then remove the capsule or ectosarc, taking care to remove as little of the bacteria as possible, and I do this with the use of a centrifuge at 1000 revolutions per minute for 1-2 minutes, examining the tube against daylight at say the end of a minute in order to determine whether or not this centrifuging treatment should be continued, as I do not wish to shake the bacteria completely out of the suspension but only the capsule. The supernatant fluid which contains the pure bacterial protein now divested of its capsule is then poured. If the bacteria is intact, as determined by microscopical examination, I standardize this bacterial emulsion by the blood counting method; but in case the bacteria have been completely split by lysis, I standardize by comparison with bacterial suspensions of known bacterial content. The antigenic strength of the bacterin may be tested by a complement fixation test and by animal and therapeutic inoculation to determine its value for antibody production.

The addition of sterile distilled water will now generally be necessary to bring the solution nearly to the tone of normal saline solution, and the amount of this addition will be indicated by the total amount of bacterial substance in grams in the original cultural magma, plus the amount of chemicals and ferment used, and the amount of water added during the process of manipulation. I do this by adding equal parts of sterile distilled water and glycerine to prevent proteolysis and mould contamination, and the solution is rendered normal by hydrometer tests.

Should the alkali be excessive it is reduced by the addition of a solution of 6% acetic acid to the point of protein suspension (a little less than neutral), and the normal tone is then again restored by the addition of sterile distilled water. The bacterin or protein is then tested for sterility by culture and animal inoculation in order to make sure of the absence of all pathogenic micro-organisms. (B. Tetani, B. Aerogenes capsulatus, etc.)

The foregoing is a more or less general description of my invention, and I will now give more detailed descriptions as applied to specific bacteria and proteins.

*Treatment of cultures of pneumococci and capsulated streptococci, for making detoxicated bacterial vaccines and proteins.*

1. I treat slant tube cultures or bacterial moist magma of such micro-organisms with sodium hydroxide in the proportions of 0.35 grams to 0.45 grams of bacterial substances with 0.1 cc. of concentrated sodium hydroxide dissolved in 0.14 cc. of sterile, warm, distilled water (a 25% solution of NaOH) by inserting such solution with a pipette into direct contact with the culture of magma, which is then treated for about 5 minutes at 37.5° C., preferably in an incubator; and the tone of this solution is approximately normal, since the water content and the bacterial content with the alkali added approximate 0.85%.

2. The action of the sodium hydroxide renders the capsule pervious after such a treatment of 5 minutes, and I then insert by means of a pipette 0.5 cc. of a solution of trypsin ferment which is sterile and chemically pure, made of dissolved 0.25 grams of C. P. powdered trypsin in 100 cc. of sterile distilled water, previously made alkaline with 1% sodium bicarbonate and warmed to blood heat; and the trypsin is allowed to act on the culture for 5 minutes in all, but not more. At the end of 2.5 minutes, I remove the culture from the incubator and add 2 cc. of sterile distilled water to bring the tone of the solution again to normal. Pneumococci and capsulated streptococci produce some toxin in the media and this toxin portion is oxidized and digested by the ferment during the first 2.5 minutes and at this point I add 2 cc. of sterile distilled water since, as is known, only a normal solution can pass through the capsular membrane, and when the solution is made normal osmosis begins to take place. During the second 2.5 minutes there is practically complete osmosis of the inner bacterial toxins and outer solutions, so that the tone of the two solutions is the same, and it is during this period that the ferment acts on these toxins located in and beneath the capsule, so that these are also rendered inert by the process of digestion. The solution now contains all the products of the bacterial cells; the broken capsules, the inner bacterial protein intact, and the toxic proteins rendered as nearly inert as possible by normal digestion in vitro; and I prefer to stop digestion at this point and maintain the non-toxic inner protein of the micro-organisms intact by separating it from the capsular and toxic portions.

3. The next step is the separation of the capsule which is accomplished by treating the solution with 0.3 grams of the 15% solution of sterile sodium oleate dissolved in warm sterile distilled water, and this is enough to make a total of 30 cc., but the solution becomes normal since the capsule is shaken out. The oleate unites with and flocculates with the capsule and surrounds the inner bacterial protein with the membrane or film of soap which aids to keep it intact and helps to remove any fatty or waxy substances in the capsule by saponification. During this step, the solution is agitated with a pipette for 3 minutes until perfect foam is secured.

4. I now devitalize, secure sterility, and stop ferment action by adding 0.5% of 95% phenol and the mixture is agitated with a pipette to complete solution thereof. The solution now contains bacterial magma 0.35 cc. sodium hydroxide in water 0.4 cc., trypsin solution 0.5 cc., water 2. cc., sodium oleate 0.3 cc., phenol 0.5 cc.; making a total of 4.05 cc., and to this I add 4.8 cc. of sterile distilled water to make the solution approximately normal.

5. I then centrifuge the solution thus obtained at 1000 revolutions per minute for 2 minutes, and then examine to ascertain whether the capsule has been shaken out, and hold the tube against the light to determine if the bacterial suspension is intact. The usual time for complete separation of the capsule is 5 minutes at low speed.

6. I then standardize by the blood counting pipette method or by comparison with known scale solutions of determined bacterial content, and then add glycerine, sodium chloride, and distilled water to normal tone as indicated by hydrometer tests. I then examine for pathogenic micro-organisms by anaerobic cultures and animal inoculation, and if the vaccine is shown thereby to be sterile, I seal it in sterile glass containers and apply the customary label thereto.

Treatment of non-capsulated staphylococci and streptococci.

1. 0.1 cc. of concentrated sodium hydroxide in 0.3 cc. of sterile distilled water, as previously described, is inserted in a culture or bacterial magma and allowed to remain in contact therewith for 3 minutes at 37.5° C.; or if on the media, until the growth begins to separate from the media. At this point the solution is agitated with the pipette until completely separated and then removed from the media to a sterile glass container.

2. I now add 0.5 cc. of the trypsin ferment solution previously described and allow this to act for 3 minutes at 37.5° C., preferably in an incubator, and I then add 2 cc. of sterile distilled water and allow this to stand 1 minute to complete normal tone.

3. I next add 0.2 cc. of 15% solution of sodium oleate, as previously described, and allow this to stand 1 minute in an incubator, whereupon it is agitated with the pipette to complete soapy solution for 1 minute. 0.5% of 95% phenol is added and agitated with the pipette to complete solution.

4. I then add sufficient sterile distilled water to approximate normal solution and centrifuge out the capsule, as above described; whereupon I standardize and test for sterility and dilute with equal parts of glycerine and water and sodium chloride to make the solution normal, as set forth above.

Treatment of Gonococci and Meningeococci.

The treatment of these two cocci is the same and I will therefore describe the treatment of only one, namely the gonococci.

1. I treat the gonococcus culture or magma with sodium hydroxide the same as I treat the staphylococci as described above, but I allow the sodium hydroxide solution to act for 5 minutes because these cocci have a thicker capsule.

2. I then treat with trypsin solution, as described above, allowing it to act for 4 minutes and add sterile distilled water 1 minute after the ferment has acted.

3.-4. I then add phenol as described above, but use no sodium oleate. I then shake out the capsule, standardize, test for sterility, etc., as described above.

Treatment of Micrococci Catarrhalis.

1. I treat these organisms with sodium hydroxide and trypsin the same as in the case of staphylococci, except that the trypsin is added at the same time as the sodium hydroxide and both are allowed to act simultaneously for 5 minutes.

2. No water is added.

3. Sodium oleate solution is used as in the treatment of staphylococci.

4. I then treat with phenol as in the case of staphylococci and let stand for an hour, and then agitate with the pipette to homogeneous solution.

5. I then shake out the capsule and proceed as indicated above.

Treatment of asthma cocci.

1. The culture on the media is treated as described above for from 5–8 minutes until the growth separates from the media. The balance of the process is the same as that for micrococcus catarrhalis, except that 1% phenol is used on the emulsion for 24 hours, to secure attenuation. This does not completely devitalize the organism but does so sufficiently for its use as an antigen in treating asthma.

2. This organism produces acid and the emulsion must therefore be rendered faintly alkaline to litmus, and this is done by adding strong sodium hydroxide. It is then diluted and standardized and rendered of normal tone by the use of sodium chloride, glycerin and sterile distilled water, as described above; and it is of course tested for sterility against other pathogens, etc.

Treatment of B. Typhosis; B. Paratyphosis A. and B.: B. Coli: B. Flexner and B. Shiga of dysentery.

1. Allow the solution of sodium hydroxide described above to act for 1 minute in the treatment of these cultures.

2. Then allow the ferment solution to act for 2 minutes, whereupon 2 cc. of sterile distilled water are added, and the whole let stand for 1 minute.

3. Add sodium oleate immediately and agitate, as described above.

4. Shake out the capsule, standardize and render normal and then test for sterility, as described above; and then test the toxicity and the antibody generating power by minute doses, such, for example, as 5 to 50 million organisms in human beings.

Treatment of B. Diphtheria, pseudodiphtheria, acne, bacillus of Hodgkin's disease, and other diphtheroid bacilli.

1. Treat with sodium hydroxide solution the same as for staphylococcus.

2. Treat likewise with trypsin.

3. Treat likewise with sodium oleate, inasmuch as these bacilli are autolyzed by the action of sodium oleate.

4. I standardize only approximately by comparison with bacterial emulsions of the same organisms of known bacterial content.

5. Shake out capsules, dilute to normal, and test for sterility, etc., as indicated above in the treatment of staphylococci.

*Treatment of B. Aerogenes capsulatus of Welch; B. Perez; B. Friedlander; and other bacilli having thick capsules; also B. Amyloclasticus intestinalis of diabetes.*

1. Treat with a strong sodium hydroxide solution described above long enough to break the capsule, the time varying from 5 to 10 minutes with the different bacilli, this being 5 minutes in the case of the bacilli of diabetes.

2. Treat with the ferment simultaneously in the strength above indicated, but insert the ferment 3 minutes after the alkali has acted. and add the sterile distilled water 2.5 minutes after the ferment has acted.

3. Add the sodium oleate and treat as indicated above with respect to staphylococcus.

4. Sterilize with phenol as indicated above and let stand for 2 minutes.

5. Shake out capsules, standardize and bring to normal and determine the sterility, etc., as indicated above.

*Process for culturing B. Amyloclasticus intestinalis in order to make a detoxicated vaccine therefrom.*

Three methods of culture may be employed to advantage:

1. Shake out the bacillus from patient's urine, after incubating same in this urine for 12 hours at normal temperature.

2. Culture from the feces on Loeffler's blood serum or plain agar flooded with starch broth.

3. Culture from urine or blood on agar flooded with starch broth. The first method may be the method of choice for rapidly obtaining the bacillus for the first vaccine, and the second and third methods for isolation and corroboration and preparing a stock vaccine.

*Process for making a vaccine from baccillus amyloclasticus intestinalis.*

1. Collect urine under sterile precautions in sterile glass container and determine percentage of sugar at once by tritration with Haine's solution. Incubate 500 cc. of this urine in sterile, cotton stoppered Elenmeyer flask for 12 hours at 37.5° C. in incubator. The presence of the bacillus is indicated by a general clouding of the urine at this time and determined by observation in hanging drop preparation. The presence of a rod shaped bacillus, which grows only on starch containing media with the production of sugar in pure culture is required.

2. Now prepare an emulsion of this bacillus by shaking it out, employing for this purpose a large tube centrifuge at 2500 to 3500 R. P. M. for 5 minutes. Determine that the organisms have been completely shaken out by holding the tube against the light, if not, continue at high speed for another three minutes, until the urine is clear.

3. Now pour off urine as completely as possible without disturbing sediment or loss of bacilli. Suspend sediment in sterile, normal saline solution by agitation with sterile pipette. Then shake down sediment twice, each time pouring off fluid so as to completely eliminate urine from the solution. At the last treatment cut down the speed of the centrifuge to 1000 R. P. M. and continue only until urinary sediment and cells are thrown down, but not the bacilli. This will require usually 2 minutes. Then determine that the bacilli are still in suspension by microscopical examination, then pour off the suspension, which must be free of urinary sediment and cells; determine again by microscopical examination and further centrifuging, if necessary, to secure a perfect suspension of the bacilli only.

4. Treat bacillary magma secured by centrifuging this suspension at high speed for 5 minutes by the method indicated above under the process for the preparation of a detoxicated vaccine from that vacillus. Add 25% of glycerine to concentrated suspension of stock vaccine to prevent proteolysis, when vaccine is to be kept over long periods. This vaccine may be standardized so that 0.5 cc. of the emulsion contains 250,000,000 organisms by dilution with normal saline solution at the time of its use.

5. The best solid media for culturing the bacillus in pure culture is agar streaked with the patient's blood and flooded with sterile broth made from sterilized oatmeal, corn, or rice meals. This broth is made by first obtaining a clear, sterile gruel of these meals, cooking them in sterile water, straining through gauze and sterilization in the Arnold, then diluting them to the consistency of broth with sterile warm water. Plain agar is first streaked with human blood and then inoculated with portions of feces or mucus from the same obtained from a known case of diabetes mellitus, and then flooded with the starch broth 0.5 cc. in each tube. Oatmeal and cornmeal broths give equally good results.

6. Pure cultures from the urine and blood may be obtained by adding one cc. of the suspected urine or blood to these agar slants flooded as above with starch broth.

*Treatment of B. Tuberculosis for preparing detoxicated tuberculin.*

1. Treat sputum containing tubercle bacilli after the method of separating this bacillus by the use of antiformine and shaking to produce homogeneous solution and sedimentation for 12 hours at room temperature in a closed container, and then pour off the supernatant fluid. The sediment is nearly pure tubercle bacilli, free of other organisms and this is washed in sterile warm saline solution and centrifuged.

2. Each 0.35 grams of the bacillus substance so obtained is treated with 0.35 milligrams of sodium hydroxide in 1.2 cc. of sterile distilled water for 7 minutes, or as an alternative the bacillary substance may be treated with 10% sodium hydroxide solution for 12 hours in an incubator at 37.5° C. until a grayish precipitate is obtained. The excess of fat is removed by extraction of acetone at 45–68° C. for 12–14 hours, whereby fat-free bacilli are obtained.

3. The defatted bacilli are treated with trypsin 10% (7 in 40 of distilled water) using 0.5 cc. of this solution for 15 minutes, whereupon 0.55 cc. of 95% phenol are added and agitated to complete solution.

4. The emulsion so obtained is neutralized by the use of 6% acetic acid up to the point of slight alkalinity to litmus. If the neutral or acid point is passed in this neutralization, bacillary substances will precipitate and a sufficient sodium hydroxide solution must be added to bring them back into solution. 6.7 cc. of sterile distilled water is then added, since bacillary substances and chemicals added amount to 3.8 cc. and thus the solution is brought to normal.

5. Add to the resulting solution 25 cc. of glycerin and sufficient sterile distilled water to bring the whole up to 100 cc. and then test for sterility, etc. Each 0.35 grams of tubercle bacillary substance thus treated is diluted with 25 cc. of glycerine and sterile water up to 100 cc. Therefore 0.1 cc. of this emulsion diluted in 30 cc. of normal saline solution gives 1/10,000 milligrams of detoxicated tubercle substance to each 0.5 cc. of the mass, which is the average dose of tubercle substance.

*Treatment of toxic proteins, pollens and antigens to produce detoxicated proteins.*

1. Treat pollen of plants toxic for human beings in the proportion of 1 gram of pollen substance to 500 cc. of 8.5% (hypertonic sodium chloride solution made up with sterile Berkfield filtered water), by rubbing up the pollen with mortar and pestle or machine macerator, adding from time to time a few drops of glacial acetic acid up to 6% of the total volume or (3 in 50) for one hour, at which time the outer capsule of the pollen will be broken and the inner portion of pollen protein released and with the toxins released into the solution.

2. Neutralize the acidity of this solution by adding sufficient normal sodium hydroxide solution, using the drop method until the solution is completely normal to litmus.

3. Filter the solution through sterile cotton, to remove excess of pollen capsule. Treat the sediment on the cotton again with sodium hydroxide and pass the filtered solution first obtained again through the cotton, so as to obtain a maximum of pollen substance.

4. Treat the whole solution thus obtained with 1% of trypsin to the total volume of the solution for one hour at 40° C., so as to completely digest and neutralize toxins present. Filter again through sterile filter paper.

5. Add a solution of sodium oleate 15% to 0.5% of the total volume of the solution. This makes a soapy solution. Allow to stand in the incubator until floccules form. This carries down more capsules and toxins, leaving approximately only detoxicated protein of the pollen in solution, which is used to generate antibodies in susceptible human beings.

6. Add 1 cc. of 95% phenol to each 10 cc. of this pollen extract, shake well and filter through a Berkfield filter. This removes any micro-organisms. Incubate again for 16 hours at 37.5° C. to allow spores of the vegetative organisms to develop. Filter again through the Berkfield filter and culture or test for B. Tetani, gas bacillus or other pathogens by animal inoculation.

7. This gives a pollen extract, which contains 1/10,000 milligrams of approximately detoxicated pollen protein to each 0.1 gram (3 minims) of the solution, the average dose in adults. Glycerine in the proportion of 25% may be added to preserve stock solutions. The above process may be repeated in detoxicating proteins which are toxic for humans, varying the length of time of applying the acetic acid and the ferment, according to whether the proteins treated are confined in a membrane or not. Toxic proteins free in solution are rendered inert by trypsin action and freedom from toxins proven by minimal inoculations.

I claim:—

1. The process for preparing detoxicated proteins and bacterial vaccines which comprises treating bacteria and bacterial toxic proteins with trypsin.

2. The process for preparing detoxicated proteins and bacterial vaccines which comprises treating capsulated bacteria and bacterial toxic proteins to make the capsules pervious and then treating with trypsin.

3. The process for preparing detoxicated proteins and bacterial vaccines which comprises treating capsulated bacteria and bacterial toxic proteins with alkali to break the capsules and then digesting with trypsin.

4. The proccess for preparing detoxicated proteins and bacterial vaccines which comprises treating capsulated bacteria and bacterial toxic proteins with sodium hydroxide to break the capsules, and then treating with pure powdered trypsin 25% in a slight alkaline solution.

5. The process for preparing detoxicated proteins and bacterial vaccines which comprises treating capsulated bacterial and bacterial toxic proteins to make the capsules pervious and then treating with a ferment and carrying the ferment through the capsules by osmosis.

6. The process for preparing detoxicated proteins and bacterial vaccines which comprises treating capsulated bacteria and bacterial toxic proteins with alkali to break the capsules, treating with a digestant and then treating with a soap solution to separate the capsules.

7. The process for preparing detoxicated proteins and bacterial vaccines which comprises treating capsulated bacteria and bacterial toxic proteins with alkali to break the capsules, treating with a digestant and then treating with sodium oleate to remove the capsules.

8. The process for preparing detoxicated proteins and bacterial vaccines which comprises treating capsulated bacteria and bacterial toxic proteins with alkali to break the capsules, treating with a digestant and then treating with a 15% solution of sodium oleate to remove the capsules.

9. The process for preparing detoxicated proteins and bacterial vaccines which comprises treating capsulated bacteria and bacterial toxic proteins with alkali to break the capsules, digesting with trypsin, treating with a soap solution to remove the capsules, treating with phenol, and centrifuging.

10. The process for preparing detoxicated proteins and bacterial vaccines which comprises treating capsulated bacteria and bacterial toxic proteins with alkali to break the capsules, treating with a digestant, treating with a soap solution to remove the capsules, treating with phenol, and centrifuging.

FRANK MONTGOMERY WOOD